Oct. 29, 1963 C. R. BASSETT 3,108,658
HYDRAULICALLY ACTUATED DISC BRAKE ASSEMBLY
Filed Oct. 17, 1962 2 Sheets-Sheet 2

INVENTOR.
Charles R. Bassett
BY
Maxwell V. Wallace
ATTORNEY.

United States Patent Office 3,108,658
Patented Oct. 29, 1963

3,108,658
HYDRAULICALLY ACTUATED DISC
BRAKE ASSEMBLY
Charles R. Bassett, 1723 65th St., Kenosha, Wis.
Filed Oct. 17, 1962, Ser. No. 231,067
3 Claims. (Cl. 188—72)

This invention relates to brake assemblies, and more particularly to a new and unique brake assembly for automobiles, or the like.

Most passenger cars use conventional, internal expanding shoe brakes wherein the brake shoes are pressed outwardly against the inside diameter of a conventional brake drum by a hydraulic piston inside a conventional hydraulic cylinder. In the present application there is disclosed a new and improved brake assembly wherein is provided a hydraulic cavity, the ends of which constitute a piston area—hydraulic pressure causing the ends of same to move away from each other thereby causing friction pads to engage revolving disks attached to a rotating wheel. The disk drum is attached to the wheel at its outer periphery instead of at the inside diameter, as is used in other types of disk brakes. Also in this new design the pressure, and therefore the braking effort, is distributed over six areas of the disk instead of at only one point as is the case in brake assemblies of other designs. This feature provides longer life to the lining and by the circulation of air through the disks a much cooler drum which not only lengthens the lining life, but prevents what is known as heat fade in the brake.

By designing the whole brake assembly around the axle tube and within the wheel cavity, the brake assembly is kept cleaner than when the inside diameter mounted disk with external yoke or caliper actuation is used. Also all the hydraulic pressure from both ends of the hydraulic cavity is actively used by the brake instead of wasting half the pressure in spreading a yoke or caliper used in other braking systems.

The above and other objects will appear more fully from the following more detailed description, and from the drawings, wherein.

Figure 1:
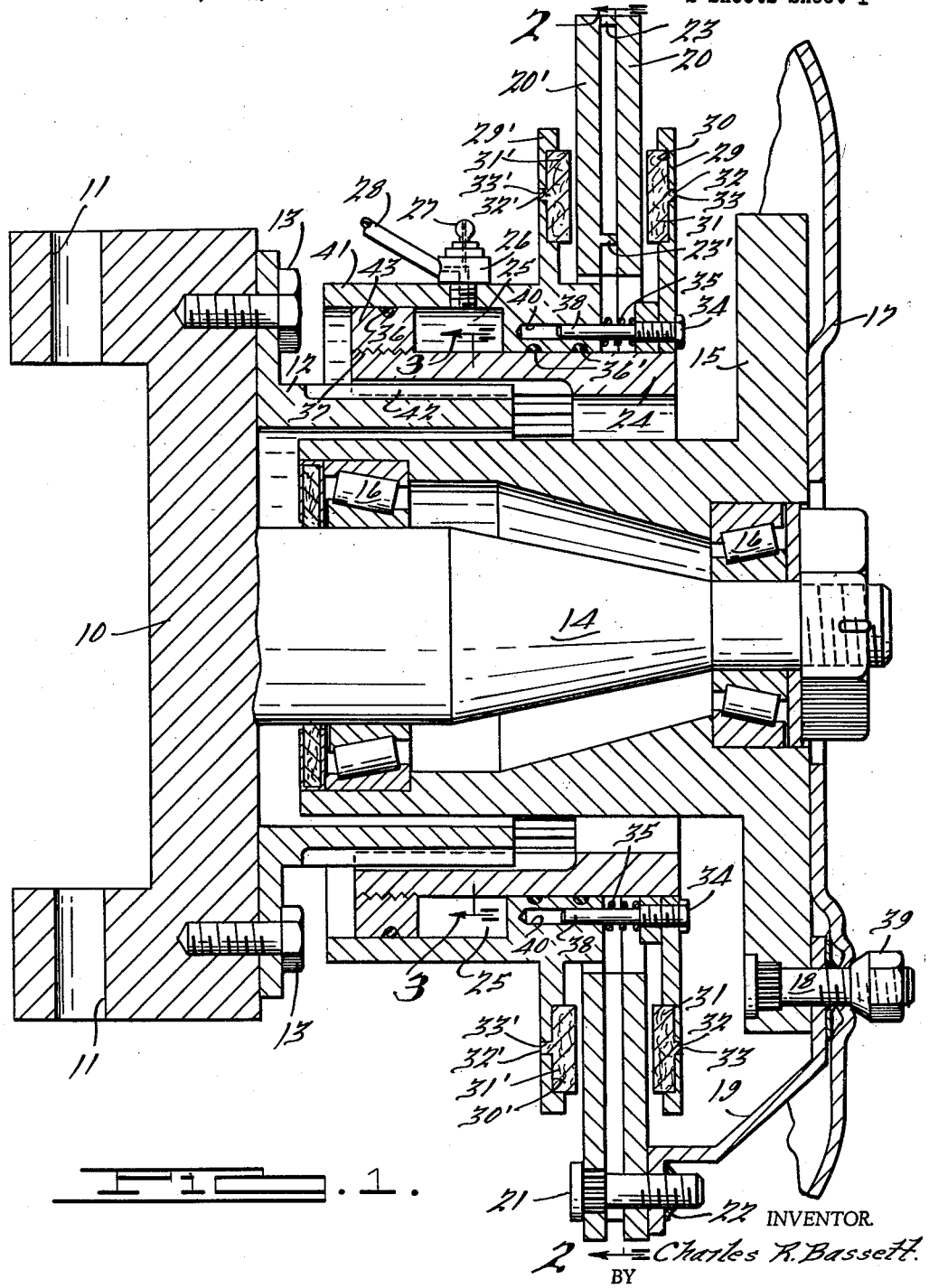
FIG. 1 is a sectional view through my brake assembly.

Referring now to the drawings, the numeral 10 designates a king-pin assembly having openings 11 therein to receive a pin to allow the front wheels of an automobile to be turned. A brake-mounting flange 12 having an upstanding tubular portion is bolted to the king-pin assembly by means of bolts 13 so that same is supported stationary on said assembly. Numeral 14 designates a spindle assembly adapted to rotatably receive a wheel hub member 15, the same rotating on bearings 16. Numeral 17 designates a wheel which is secured to wheel hub member 15 by means of a plurality of wheel-mounting bolts 18, which in turn are adapted to receive a holding nut 39. To each wheel mounting bolt 18 there is secured a brake disk-mounting bracket 19 which in turn supports a pair of opposed brake disks 20, 20' supported by means of bolts 21 having a self-locking nut 22 thereon.

Mounted on brake disks 20, 20' in staggered relationship, are disk separator cooling fins 23, 23'. Slidably, but not rotatably mounted on brake-mounting flange 12, is provided a cylindrical base and torque mounting member 24, formed of aluminum, or the like. An aluminum casting, or the like, 41 has formed therein a circumferential hydraulic recess or cavity 25, the same having a hydraulic fitting 26 mounted thereon and an air bleeder 27 provided therein and a fluid conduit 28 leading into said hydraulic fitting 26 from a master cylinder, not shown.

Mounted on cylinder base 24 is a friction disk or shoe 29 having a recess 30 formed therein to receive a brake lining pad member 31, the same being held securely in said recess 30 by means of a rivet member, or the like, 32—which in turn is inserted through a knock-out opening 33 in disk 29. So that friction disk 29 may move toward and away from brake disk 20, there is provided a friction disk bolt 34 having formed thereon a torque pin 38 which has mounted thereon a separator spring 35 which allows friction disk 29 to return to its normal open position away from contact with brake disk 20. A drilled hole 40 is provided in slidable casting 41 which in turn also carries a friction disk or shoe 29' as part of it and a brake lining pad 31' nested within a recess 30'.

A spline 42 is provided to prevent rotation of cylindrical base 24, but to allow longitudinal movement between brake mounting flange 12 and cylindrical base 24. A ring member 43 forms one side of hydraulic cavity 25 and is secured to cylindrical base 24 by threads 37. O rings 36, 36' are provided to form a seal between the cylindrical base and casting 41 to prevent fluid leaking from chamber 25.

The manner in which the device operates is as follows:

When it is desired to stop wheel 17, rotatably secured to axle 14, from rotating, the car operator has simply to press downwardly on a brake pedal, not shown, which in turn forces brake fluid from the master brake cylinder of an automobile, not shown, down tube 28 into hydraulic fitting 26 and thence into brake fluid cavity 25, which hydraulic pressure of said fluid in said cavity 25 provides a piston action which in turn causes casting 24 to move to the left on spline 42 on brake mounting flange 12. Inasmuch as casting 24 has friction disk 29 mounted thereon and disk 29 has mounted therein brake lining pad 31, said pad 31 contacts brake disk 20 which in turn is rotating with wheel 17 through brake disk mounting bracket 19. Simultaneously casting 41 is moved to the right—said casting having mounted thereon brake disk 29', which in turn has mounted therein brake lining pad 31', said pad 31' contacts brake disk 20' which in turn is also rotating with wheel 17. Inasmuch as there are six of these opposed brake lining pads 31, 31' mounted in stationary disks 29, 29' and spaced about castings 24, 41, it will be seen that as the pads contact the revolving disks 20, 20', which in turn are revolving with wheel 17, said wheel 17 will be caused to stop. As opposed friction disks 29, 29' move toward each other to contact revolving brake disks 20, 20', friction disk bolt 34 carried by casting 24 and having formed thereon torque pin 38 with separator spring 35 mounted thereon, moves to the left into recess 40 in casting 41. It will be seen that the braking effort is distributed over six areas of the disks instead of at only one point as found in other designs.

Once the pressure on the brake pedal in the automobile is released by the driver, hydraulic pressure is released in circumferential hydraulic cavity 25 and separator springs mounted on torque pins 38 move said pins out of recess 40 and force friction disks 29, 29' away from each other and thence away from contact with brake disks 20 and 20' to their position shown in FIG. 1 of the drawings, and wheel 17 is free to revolve.

Figure 2:
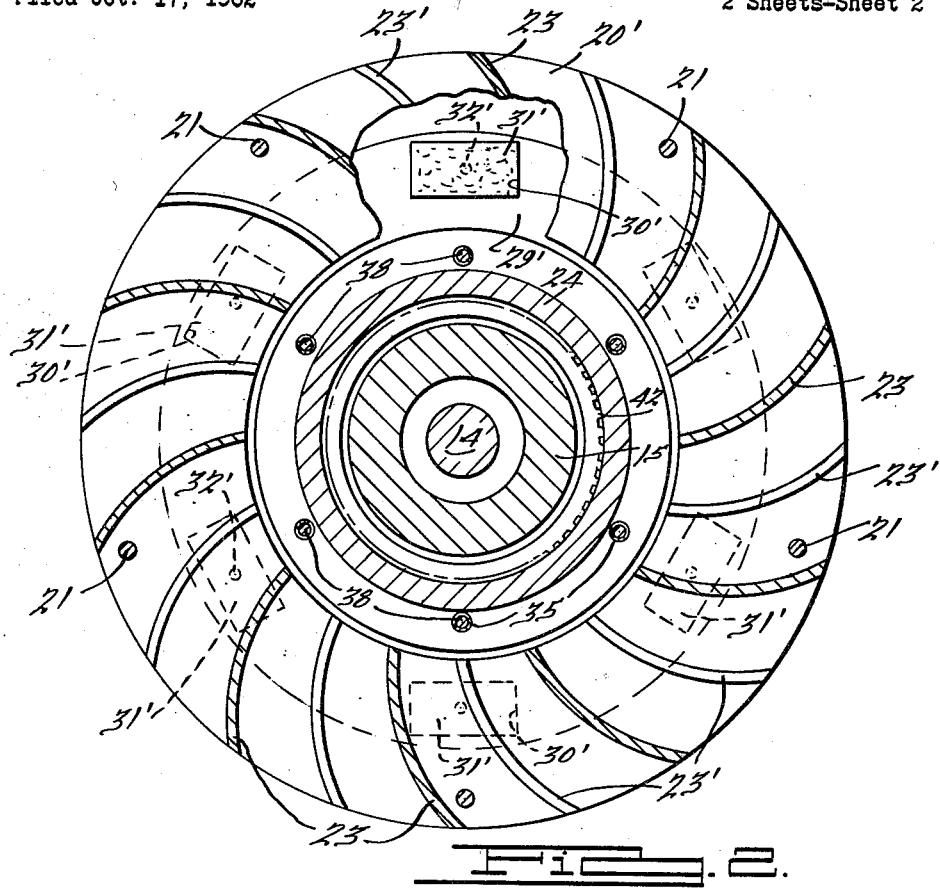
FIG. 2 is a sectional view taken substantially along line 2—2 of FIG. 1.
Figure 3:
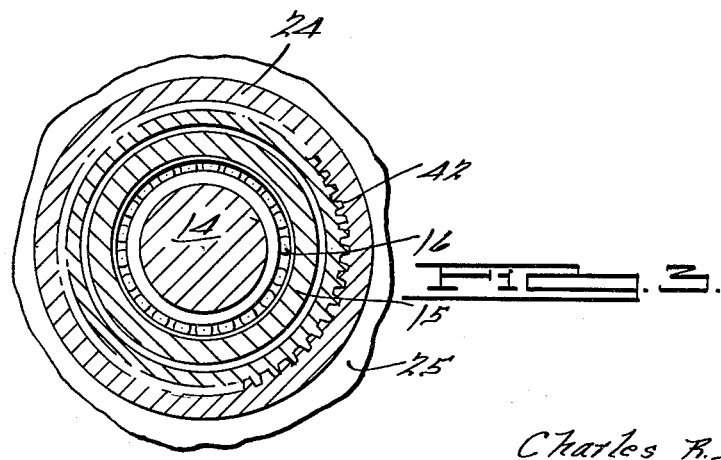
FIG. 3 is a sectional view taken substantially along line 3—3 of FIG. 1.

The staggered cooling fins 23, 23' are shown best in FIG. 2 of the drawings, the same being formed as opposed half-fins mounted on opposed revolving brake disks 20, 20'. The opposed brake disks are secured to the wheel at its outer periphery instead of at the inside diameter, as in other types of disk brakes. The drum disk is made of two pieces with ribs on one side of each piece. In assembling the disk, the ribbed sides are put together forming air passages through the center of said disk and the rotation of the disks pumps air through the center of the opposed disks to carry away the heat of braking.

Threaded ring member 43, threaded as at 37, forms an inner cylinder wall for fluid cavity 25 and has an O ring 36 which acts as a seal to prevent fluid leaking from said cavity 25. Additional O rings 36' also prevent fluid leaking from cavity 25.

There has been disclosed herein a new and unique brake assembly self-contained wherein a hydraulic cavity acts as a piston to move braking means toward and away from opposed revolving disks to stop wheel movement. Spaced apart friction pads contact the revolving disks so that the braking effort is distributed over six areas of the disks instead of only at one point as is common in most designs. The disk or drum is attached to the wheel at its outer periphery instead of at the inside diameter as in other brake assemblies and the drum disk is formed in two parts with ribs on one side of each piece to form fins which in turn allows the passage of air through the center of the disks to carry away the heat of braking. The operating pressure and mechanism is located in the center of the disks and is self-balancing as to applied forces, all forces being applied through the inside diameter of the disks instead of through a yoke over the outside diameter of the drum as in other designs, wherein one-half the total pressure is wasted in the yoke which holds the single ended hydraulic cylinders. The spaced about braking pads give longer life to the lining and the circulation of air through the disks provides a much cooler drum disk which not only lengthens the lining life, but prevents what is known as heat fade in the brake. By designing the whole brake assembly around the spindle or axle tube and within the wheel cavity, the brake assembly is kept cleaner than when the inside diameter mounted disk with external yoke or caliper actuation is used. Also all the hydraulic pressure from both ends of the hydraulic cavity is actively used by the brake instead of wasting half the pressure in spreading the yoke or caliper.

While I have described and illustrated a satisfactory device that has proven highly successful in practical operation, it will be understood that the invention is not limited to specific constructional details shown and described, but that many changes, variations, and modifications may be resorted to without departing from the principles of my invention.

I claim:

1. A brake assembly comprising a brake disk; a torque mounting member having a first friction disk secured to one of its ends; a casting mounted on said torque mounting member and having a second friction disk on one of its ends, the said casting and torque mounting member being relatively slidable with respect to each other and the said friction disks carried by the same being disposed on opposite sides of the brake disk, and hydraulic pressure means acting on said casting and torque mounting means for causing them to conjointly and simultaneously move toward each other and thereby clamp said brake disk between the aforesaid friction disks, the said hydraulic pressure means including a cavity formed between said casting and torque mounting means and a fluid conduit leading into said cavity for creating hydraulic pressure therein.

2. The combination set forth in claim 1 wherein means is associated with the said friction disks for causing at least one of said disks to become disengaged from the said brake disk upon release of pressure in said hydraulic pressure means.

3. The combination set forth in claim 1 wherein the said casting has a hole drilled in the upper end thereof and the friction disk carried by said torque mounting means is provided with a spring-biased torque pin extending into said hole, the arrangement being such that upon release of hydraulic pressure in said cavity the spring biased torque pin will cause the friction disk carried by said torque mounting means to move out of contact with said brake disk.

References Cited in the file of this patent

UNITED STATES PATENTS

| | | |
|---|---|---|
| 2,033,835 | Lansing | Mar. 10, 1936 |
| 2,083,989 | Eisenhardt | June 15, 1937 |
| 2,487,117 | Eaton | Nov. 8, 1949 |
| 2,778,452 | Dasse | Jan. 22, 1957 |
| 2,888,102 | Eksergian et al. | May 26, 1959 |